United States Patent [19]
Reitmeier

[11] Patent Number: 6,118,486
[45] Date of Patent: Sep. 12, 2000

[54] SYNCHRONIZED MULTIPLE FORMAT VIDEO PROCESSING METHOD AND APPARATUS

[75] Inventor: Glenn A. Reitmeier, Yardley, Pa.

[73] Assignee: Sarnoff Corporation, Princeton, N.J.

[21] Appl. No.: 09/001,952

[22] Filed: Dec. 31, 1997

Related U.S. Application Data

[60] Provisional application No. 60/060,112, Sep. 26, 1997.

[51] Int. Cl.$^7$ .............................. H04N 7/01; H04N 11/20
[52] U.S. Cl. ........................ 348/441; 348/435; 348/458; 348/512; 348/536; 348/537; 348/555
[58] Field of Search .................................. 348/441, 403, 348/426, 445, 687, 688, 396, 452, 512, 555, 696, 556, 458, 561, 435, 436, 845; 315/536–537; 345/8; 386/75; 375/376; H04N 7/01, 11/20

[56] References Cited

U.S. PATENT DOCUMENTS

| | | | |
|---|---|---|---|
| 4,251,835 | 2/1981 | Eriksen | 348/550 |
| 5,043,811 | 8/1991 | Yasuhiro | 358/140 |
| 5,128,760 | 7/1992 | Chauvel | 358/140 |
| 5,132,793 | 7/1992 | Hirahata et al. | 358/140 |
| 5,168,362 | 12/1992 | Yoshida | 358/171 |
| 5,210,705 | 5/1993 | Chauvel et al. | 364/572 |
| 5,243,421 | 9/1993 | Nagata et al. | 358/140 |
| 5,583,652 | 12/1996 | Ware | 386/75 |
| 5,623,311 | 4/1997 | Phillips et al. | 348/396 |
| 5,638,130 | 6/1997 | Linzer | 348/445 |
| 5,657,034 | 8/1997 | Yamazaki | 345/8 |
| 5,659,776 | 8/1997 | Chauvel | 395/800.22 |
| 5,664,044 | 9/1997 | Ware | 386/75 |
| 5,699,392 | 12/1997 | Dokic | 375/376 |
| 5,712,532 | 1/1998 | Ogino et al. | 315/1 |
| 5,712,652 | 1/1998 | Sato et al. | 345/90 |
| 5,712,689 | 1/1998 | Yasuki et al. | 348/561 |
| 5,742,623 | 4/1998 | Nuber et al. | 371/47.1 |
| 5,784,119 | 7/1998 | Noda et al. | 348/512 |
| 5,790,842 | 8/1998 | Charles et al. | 395/559 |
| 5,812,210 | 9/1998 | Arai et al. | 348/555 |
| 5,844,623 | 12/1998 | Iwamura | 348/553 |
| 5,856,849 | 1/1999 | Aihara | 348/445 |
| 5,896,177 | 4/1999 | Hwang | 348/445 |
| 5,912,710 | 6/1999 | Fujimoto | 348/445 |
| 5,940,148 | 8/1999 | Joseph et al. | 348/845 |
| 5,959,659 | 10/1999 | Dokic | 348/7 |
| 5,966,385 | 10/1999 | Fujii et al. | 370/465 |

OTHER PUBLICATIONS

International Search Report PCT/US98/20235.

*Primary Examiner*—John K. Peng
*Assistant Examiner*—Linus H. Lo
*Attorney, Agent, or Firm*—William J. Burke

[57] ABSTRACT

A multiple format video signal processing system operating in conjunction with a display device timing system to produce synchronized video and timing signals suitable for use by a fixed horizontal scanning frequency display device.

20 Claims, 2 Drawing Sheets

SYNCHRONIZED MULTIPLE FORMAT VIDEO PROCESSING METHOD AND APPARATUS

The invention claims benefit of U.S. Provisional Application Ser. No. 60/060,112, filed Sep. 26, 1997 and incorporated herein by reference in its entirety.

This application is related to U.S. patent application Ser. No. 09/001,596 (Attorney Docket No. 12213), filed on the same date as the present application.

This application is related to U.S. patent application Ser. No. 09/001,620 (Attorney Docket No. 12669), filed on the same date as the present application.

The invention relates to video processing systems generally, and more particularly, video processing systems capable of receiving and processing a plurality of video signal formats, such as the various high definition and standard definition formats.

BACKGROUND OF THE DISCLOSURE

Present television receivers, such as NTSC (National Television Standards Committee) television receivers, include video processing circuitry that typically must process a video signal conforming to only a single, predetermined video format. Future digital television (DTV) receivers are expected to be implemented substantially in accordance with the transmission standards established by the Advanced Television Standards Committee (ATSC). A similar standard is the European Digital Video Broadcasting (DVB) standard. A compressed digital video system is described in the ATSC digital television standard document A/53, incorporated herein by reference. Moreover, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is incorporated herein by reference. The new DTV standards allow broadcasters to deliver virtually any format up to 1920×1080 pixels. Specifically, DTV receivers must be capable of receiving source video comprising image sequences that vary in spatial resolution (480 lines, 720 lines, or 1080 lines), in temporal resolution (60 fps, 30 fps, or 24 fps), and in scanning format (2:1 interlaced or progressive scan).

It is known in the computer industry to display multiple graphics formats on a so-called "multisync" display device. Specifically, a multisync display changes horizontal and/or vertical scanning frequencies in response to a change in graphics format. Such a multisync approach may be implemented in a video or television environment by using, e.g., studio equipment raster formats standardized by the Society of Motion Picture and Television Engineers (SMPTE). Unfortunately, the multisync approach leads to an increase in cost due to the more complicated deflection circuitry, an increase in power consumption, and a high inter-format switching latency (i.e., greater than one video frame) due to long time constants associated with deflection coil inductance.

A better approach was disclosed by Lee in U.S. Pat. No. 5,485,216, issued Jan. 16, 1996 for Video Conversion Apparatus for High Definition Television, incorporated herein by reference in its entirety. In the Lee patent, a high definition television signal is decoded, then converted to a 30 Hz frame rate, then vertically decimated, then horizontally decimated and then interleaved to produce a 30 Hz, 1050 vertical scanning line video signal. Thus, the Lee arrangement provides a brute force technique for converting a high definition television signal into a 30 Hz, 1050 vertical scanning line video signal. The format-converted television signal is then processed in a conventional manner to produce a picture.

Unfortunately, the Lee arrangement disadvantageously requires complex timing, switching and video processing circuitry. Moreover, the Lee arrangement merely provides a front-end format converter to a standard display device.

Therefore, a need exists in the art for a cost-effective video processing system suitable for use in, e.g., a multiple format television receiver. It is also seen to be desirable to provide a video system that advantageously utilizes display timing processing that, unlike prior art front-end video processing systems, comprehensively reduces total system cost and complexity.

SUMMARY OF THE INVENTION

The invention comprises an apparatus and method suitable for use in a digital television (DTV) system. The invention provides a multiple format video signal processing system operating in conjunction with a display device timing system to produce video and timing signals that are derived from a single system clock, and are suitable for use by a fixed horizontal scanning frequency display device. The video signal processing system comprises a format converter and a frame rate converter, while the display device timing system comprises a clock circuit that produces a system clock and raster clock signal that are easily derived from a transport stream clock reference.

Part of the invention lies in the recognition by the inventor that display raster signals do not need to conform to the waveforms commonly used in prior art display driver circuits, studio equipment and production standards. Specifically, the inventor recognized that considerable cost savings may be achieved in a multiple video format system by utilizing a raster (pixel) clock and horizontal and vertical deflection frequencies that are easily derived from the 27 MHz system clock used for receiver synchronization in an MPEG-like video processing system. Moreover, the inventor recognized that further cost savings may be achieved by selecting, for use by a display device, a single horizontal scanning frequency and adapting the video format of a received video signal to a format defined by, e.g., the selected horizontal scanning frequency and the resolution of the display device. In addition, the inventor recognized that practical, low-cost television receiver may be implemented by carefully coordinating video format conversion, video frame rate conversion and display timing control systems such that good picture quality is achieved in a multiple video format environment.

A method for generating video and timing signals according to the invention, and suitable for use in a system for processing a video stream associated with a plurality of video formats, including a plurality of horizontal and vertical display formats, comprises the steps of receiving the video stream and an associated format indicia; generating, in response to a reference clock signal associated with the video stream, a raster clock signal; generating, in response to the raster clock signal, a fixed frequency horizontal synchronizing signal and a vertical synchronizing signal, wherein the fixed frequency horizontal synchronizing signal and the vertical synchronizing signal defining an active viewing area on, e.g., a display device; and scaling, in response to the format indicia, the horizontal and vertical display formats of the video stream, wherein the scaling produces a video signal suitable for producing an image within the defined active viewing area.

The invention is an apparatus for use in a system receiving and decoding MPEG-like information streams to produce an output video signal suitable for use by a display device, the MPEG-like information streams carrying video information having a plurality of video formats, the display device associated with a native display format and a nominal display frequency, and the apparatus comprising: a clock circuit, for producing a first clock signal suitable for deriving all necessary clock signals used within at least a decoder portion of the system, and suitable for use as a display clock, including a second clock signal suitable for use as a system clock; and a raster generator, coupled to said clock circuit, for deriving from the first clock signal raster timing signals having frequencies appropriate to the display.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention claims benefit of U.S. Provisional Application Ser. No. 60/060,112, filed Sep. 26, 1997, and incorporated herein by reference in its entirety.

The invention will be described within the context of a digital television (DTV) receiver, illustratively an ATSC television receiver. However, it will be apparent to those skilled in the art that the invention is applicable to any multiple format video processing system, including those systems adapted to DVB, MPEG-1, MPEG-2 and other information streams.

Figure 1:
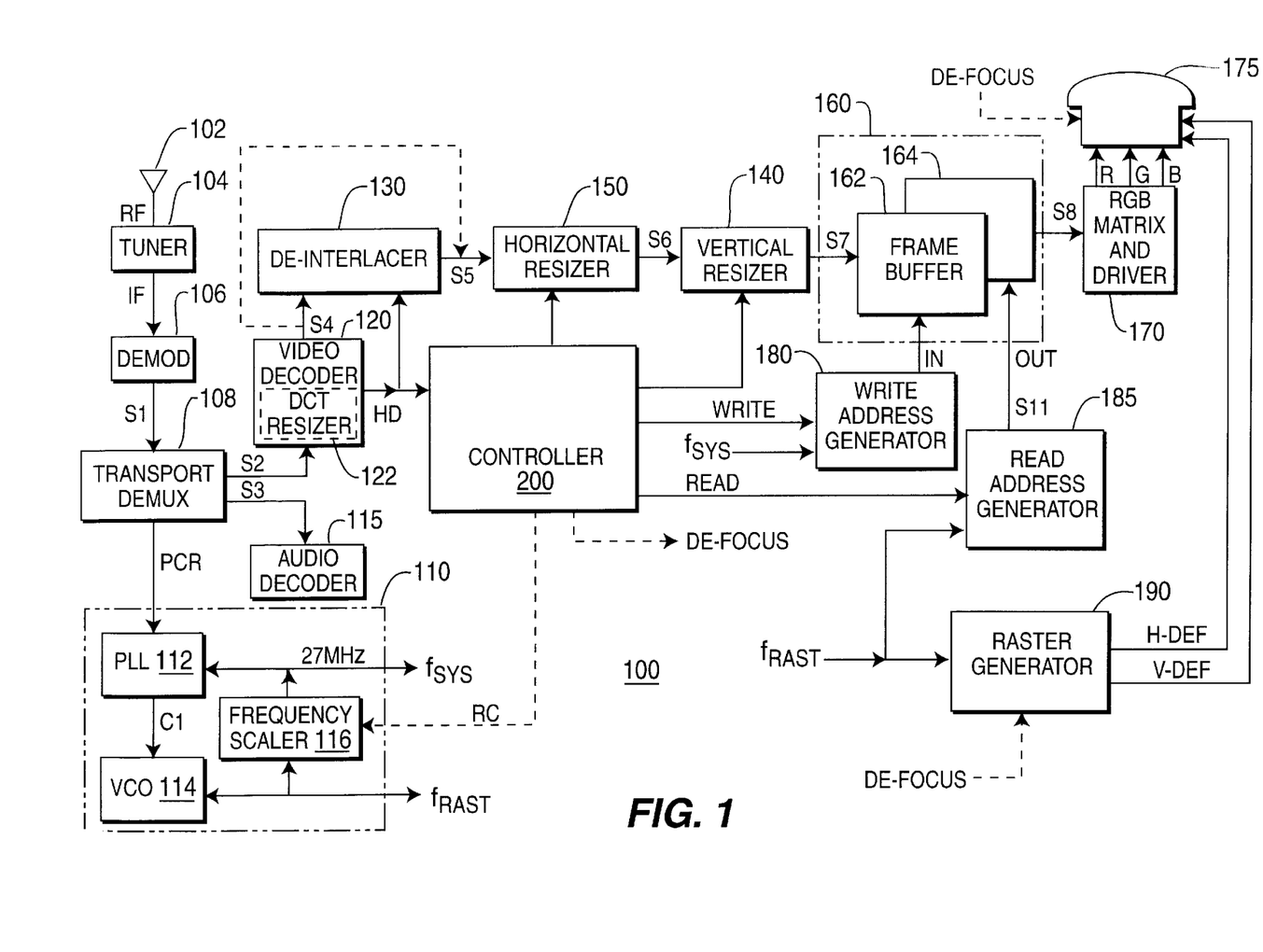
FIG. 1 shows high-level block diagram of a television receiver according to the invention.

FIG. 1 shows high-level block diagram of a DTV receiver 100 according to the invention. Specifically, the DTV receiver 100 comprises a video processing section and a display device timing section. The video processing section comprises a video decoder 120, a de-interlacer 130, a vertical resizer 140, a horizontal resizer 150 and a frame buffer 160. The display device timing section comprises a clock circuit 110, a raster generator 190, a read address generator 180 and a write address generator 185. A video signal S2 to be processed by the video processing section is received by, e.g., a DTV front end comprising, e.g., an antenna 102, a tuner 104, a demodulator 106 a transport demultiplexer 108. A processed video signal S8 is displayed (after appropriate color matrix processing) on, e.g., a display device 175 according to horizontal and vertical timing signals H-DEF and V-DEF produced by raster generator 190. A controller 200 causes the video processing section 120–160 and display device timing sections 110, 180–190 to operate in a manner that facilitates efficient processing of a video signal S8 and associated timing signal for a display device.

RF source 102 (illustratively, an antenna or cable television distribution network), provides a radio frequency (RF) signal RF comprising a plurality of television signals modulated according to a vestigial sideband (VSB), quadrature amplitude modulation (QAM) or other suitable modulation scheme. The provided RF television signals are coupled to tuner 104, which downconverts a desired television signal to produce a first intermediate frequency (IF) television signal IF. A demodulator 106, illustratively a VSB or QAM demodulator, demodulates the IF television signal IF to produce a digital information stream S1, illustratively an MPEG-like system stream S1 containing one or more MPEG-like program transport streams.

The MPEG-like program transport streams are analogous to NTSC channels, in that each program transport stream typically transports the video and audio portions of a single program, such as a movie or other audio-visual program. Each program transport stream comprises a plurality of elementary streams associated with the video and audio portions of the transported audio-visual program.

Transport demultiplexer 108 operates in a known manner to demultiplex a particular program transport stream from the MPEG-like system stream S1. Elementary audio stream (s) S3 associated with the demultiplexed program transport stream are coupled to an audio decoder 115 for decoding prior to processing by an audio driver circuit (not shown). Elementary video stream(s) S2 associated with the demultiplexed program transport stream are coupled to video decoder 120.

Transport demultiplexer 108 also extracts a program clock reference (PCR) signal included in so-called adaptation fields of selected transport stream packets (i.e., reference packets) of the demultiplexed program transport stream. The PCR is a sample of the 27 MHz clock that was used to encode the demultiplexed program transport stream prior to transmission of the program transport stream. The extracted PCR is coupled to clock circuit 110.

Clock circuit 110 comprises, illustratively, a phase locked loop (PLL) 112, a voltage controlled oscillator (VCO) 114 and a frequency scaler 116. The clock circuit 110 generates a system clock $f_{SYS}$, illustratively a 27 MHz system clock suitable for processing MPEG-like information streams. The clock circuit 110 utilizes the PCR extracted from the demultiplexed program transport stream to lock the decoder system clock (i.e., the system clock $f_{SYS}$) of DTV receiver 100 to the system clock of the encoder that produced demultiplexed program transport stream. The clock circuit 110 also generates a raster clock $f_{RAST}$, illustratively a 61.5 MHz, 81 MHz, 94.5 MHz or 108 MHz raster clock suitable for generating an image on a display device in accordance with the invention. The raster clock $f_{RAST}$, and especially the selection of 61.5 MHz, 81 MHz, 94.5 MHz and 108 MHz clock frequencies, will be described in more detail below.

PLL 112 operates in a known manner to generate a control signal C1 in response to a comparison of the (nominally) 27 MHz output of the frequency scaler 116 to the PCR received from the transport demultiplexer 108. VCO 114, in response to control signal C1, operates in a known manner to increase or decrease the frequency of the raster clock $f_{RAST}$. Frequency scaler 116 scales the frequency of the raster clock $f_{RAST}$ to produce the 27 MHz system clock $f_{SYS}$. In the case of an 81 MHz raster clock $f_{RAST}$, frequency scaler 116 performs, e.g., a divide by three operation. In the case of a 61.5 MHz raster clock $f_{RAST}$, frequency scaler 116 performs, e.g., a divide by five operation followed by a multiply by two operation. Frequency scaler 116, in response to an optional raster control signal RC from controller 200, changes the scaling parameters used to process the raster clock $f_{RAST}$, thereby changing the frequency of the raster clock $f_{RAST}$.

Video decoder 120 decodes the video stream S2 in a standard manner to produce a decoded video signal S4 having a given transmission format and frame rate. The video decoder 120 examines the sequence header of video stream S2 to determine the format, colorimetry (if available) and other information associated with the video signal encoded within video stream S2. Upon examining the sequence header, video decoder 140 couples the format, colorimetry and other information to an output as a header data signal HD.

De-interlacer 130 receives the decoded video signal S4 and at least a portion of the header data signal HD. If the decoded video signal S4 comprises video information having an interlaced format (as indicated by the HD signal), then de-interlacer 130 converts the decoded video signal S4 into a progressive scan format video signal that is coupled to an output as video signal S5. If the decoded video signal S4 comprises video information having a progressive scan format, then de-interlacer 130 couples the decoded video signal S4 directly to the output as video signal S5. The de-interlacer 130 may be implemented, illustratively, using a motion-adaptive approach that requires frame(s) storage, or using a straightforward a vertical interpolation or line repetition approach.

Horizontal resizer 150 receives the video signal S5 and, in response to a control signal HS from controller 200, selectively changes the number of picture elements (pixels) per line of video information included within video signal S5. Horizontal resizer 150 produces a horizontally resized video signal S6. Horizontal resizer 150 is capable of increasing the number of pixels per line by, e.g., using interpolation techniques to calculate luminance and chrominance information of a new pixel to be inserted between two existing pixels. Horizontal resizer 150 is capable of decreasing the number of pixels per line by, e.g., decimating a video line by removing every Nth pixel in the line.

Vertical resizer 140 receives the horizontally resized video signal S6 and, in response to a control signal VS from a controller 200, selectively changes the number of vertical scanning lines per frame of video information included within video signal S6. Vertical resizer 140 produces a vertically resized video signal S7. Vertical resizer 140 is capable of increasing the number of lines per video frame by, e.g., using interpolation techniques to calculate luminance and chrominance information of a new line to be inserted between two existing lines. Vertical resizer 140 is also capable of decreasing the number of lines per video frame by, e.g., decimating a video frame by using interpolation techniques to calculate new scan lines at a reduced line density.

In the case of optional de-interlacer 130 being implemented using the aforementioned vertical interpolation, or line repetition approach, the de-interlacing function may be incorporated within vertical resizing unit 140. In this case, horizontal resizer 150 is coupled to receive the decoded video signal S4 directly from the video decoder 120, as indicated by the dashed line in FIG. 1.

Frame buffer 160 receives the selectively vertically and horizontally resized video signal S7. Frame buffer 160 is a double buffering type of frame buffer comprising an input frame store buffer 162 and an output frame store buffer 164. The video information within video signal S7 is stored in the input frame store buffer 162 in response to a buffer input control signal IN. When the contents of the output frame store buffer 164 are entirely read, the contents of the input frame store buffer 162 are moved to the output frame store buffer 164. The video information stored in the output frame store buffer 164 is coupled to a frame buffer output as buffered video signal S8 in response to a buffer output control signal OUT. Since frame buffer 160 is a double buffering type of frame buffer, output data may be retrieved from the output frame store buffer 164 at data rate that is higher (or lower) than the rate at which input data is stored in the input frame store buffer 162. That is, the clock frequency associated with video signal S7 does not need to be the same as the clock frequency associated with buffered video signal S8. To utilize 30 Hz video information for 60 Hz display, each video frame is read out twice from the output frame store buffer 164 before the next video frame is move into the output frame store buffer 164.

Frame buffer 160 is, preferably, a double buffering arrangement as depicted in FIG. 1. It must be noted that a single buffering arrangement may also be used, but that the single buffer arrangement tends to produce a "tearing" artifact on a displayed image when the buffer read and buffer write rates are different. In the exemplary embodiment, the buffer read rate (determined by the OUT signal) and the buffer write rate (determined by the IN signal) are likely to be different.

RGB matrix and driver 170 receives the buffered video signal S8. RGB matrix and driver 170 operates in a known manner to process buffered video signal S8 according to matrix coefficients, transfer characteristics and color primary information included within a sequence header of elementary video stream S2. Specifically, RGB matrix and driver 170 performs the color conversion processing needed to convert the transmitted Y, Cr, Cb color components to the red (R), green (G) and blue (B) color signals needed for display. The three color signals R, G, and B are coupled to a display device 175, where each color signal is used to drive, e.g., an associated electron gun in a picture tube (not shown). It must be noted that the three color signals R, G, and B generated by RGB matrix and driver 170 may require additional amplification by appropriate driver circuitry (not shown) before being coupled to the display device 175.

Raster generator 190 generates a fixed frequency horizontal deflection signal H-DEF and a vertical deflection signal V-DEF in a conventional manner in response to a raster clock signal $f_{RAST}$. The raster clock signal $f_{RAST}$ is generated the clock circuit 110, as previously described. The horizontal and vertical deflection signals H-DEF, V-DEF are used to drive, e.g., associated horizontal and vertical deflection coils, respectively, in a picture tube. It must be noted that the horizontal and vertical deflection signals H-DEF, V-DEF generated by raster generator 190 may require amplification by appropriate driver circuitry (not shown) before being coupled to the display device 175. For example, a horizontal deflection signal H-DEF having a frequency of 33.75 kHz may be generated by dividing, e.g., a 67.5 MHz raster clock $f_{RAST}$ by 2000, or by dividing an 81 MHz raster clock $f_{RAST}$ by 2400. Similarly, a vertical deflection signal V-DEF having a frequency of 30 Hz may be generated by dividing the horizontal deflection signal H-DEF by 112500. Thus, the timing signals used for the display are derived from a raster clock signal $f_{RAST}$ that is scaled, in a straightforward manner, from the 27 MHz MPEG system clock $f_{SYS}$.

Write address generator 180 generates the frame buffer input control signal IN in response to a control signal WRITE, from controller 200, and the clock signal $f_{SYS}$, or another decoder clock within the receiver. Similarly, read address generator 185 generates the buffer output control signal OUT in response to a control signal READ, from controller 200, and a clock signal $f_{RAST}$. It is important to note that the video information within video signal S7 is stored in the input frame store buffer 162 at a rate determined by a system clock $f_{SYS}$. Similarly, the video information stored in the output frame store buffer 164 is retrieved at a rate determined by a raster clock $f_{RAST}$. Thus, in the case of, e.g., a 27 MHz decoder clock and an 81 MHz raster clock $f_{RAST}$, data is retrieved from the frame buffer 160 at three times the storage rate.

Controller 200 receives format, colorimetry and other information relating to the decoded video signal S4 from the video decoder 120 via the header data signal HD. Controller 200 utilizes this information, and additional information related to the display device 175 (e.g., the native format of the display device), to generate a vertical size control signal VS for vertical resizer 140, a horizontal size control signal HS for horizontal resizer 150, a write address control signal WRITE for write address generator 180 and a read address control signal READ for read address generator 185. Controller 200 optionally provides raster control signal RC that causes frequency scaler 116 to change the scaling parameters used to process the raster clock $f_{RAST}$, thereby changing the frequency of the raster clock $f_{RAST}$.

In one embodiment of the invention, all of the above processing and storage operations are performed using the 4:2.0 sampling (i.e., MPEG YUV) component format in order to minimize processing and storage requirements.

An ATSC receiver, such as the exemplary DTV receiver 100 of FIG. 1, will need to process video signals according to at least the ATSC recommended compression formats. These formats are shown below in Table 1. In Table 1, "P" denotes progressive scan and "I" denotes interlaced scan. It should also be noted that the frame rate numbers shown in Table 1 are integer values; the ATSC standard also allows the frame rate values to be multiplied by 1000/1001 (i.e., 59.94 Hz, instead of 60 Hz).

TABLE 1

| Active Vertical Lines | Active Pixels | Aspect Ratio | Picture Rate |
| --- | --- | --- | --- |
| 1080 | 1920 | 16:9 | 60I, 30P, 24P |
| 720 | 1280 | 16:9 | 60P, 30P, 24P |
| 480 | 704 | 16:9 and 4:3 | 60P, 60I, 30P, 24P |
| 480 | 640 | 4:3 | 60P, 60I, 30P, 24P |

The 640×480 and 704×480 formats are of particular importance and, more specifically, the issue of upconverting 480 line format video signals for display on a 1080 line display device. The ratio of 1080:480 is 9:4, a relationship that was specifically chosen to be the ratio of small integer numbers, though implementation of such an upconversion is relatively complicated.

To reduce system cost and complexity, the DTV receiver 100 of FIG. 1 avoids the above-described 9:4 ratio vertical resolution upconversion (i.e., 1080:480) by instead upconverting at a 2:1 ratio (i.e., 960:480). That is, a 480 line video signal is upconverted to a 960 line video signal using a less complex 2:1 vertical upconversion (i.e., resizing) operation. Such a 2:1 upconversion is performed by vertical resizer 140, in response to control signal VS from controller 150, by simple interpolation of a new horizontal scan line between each existing scan line. Thus, in the case of a 480 line input signal, the vertical resizer 140 produces a an output video signal S6 having a 960 line format. As previously noted, prior to performing a vertical resolution upconversion operation, a 480 line interlaced video signal (or any interlaced signal to be displayed on a progressive scan display device) is preferably de-interlaced to produce a 480 line progressive scan video signal, thereby avoiding the display of interline artifacts on a progressive scan display device.

To reduce system cost and complexity, the DTV receiver 100 of FIG. 1 utilizes a non-standard frequency for raster clock $f_{RAST}$ (i.e., the display clock). Such use of a non-standard frequency is possible because the video information to be displayed in a DTV system is not associated with a particular timing or synchronizing signal, such as the synchronizing pulses within a standard (i.e., analog) video signal. Moreover, the display raster signals within a DTV display system do not need to conform to the standard raster frequencies commonly used in existing television display systems. For example, the typical display clock frequency used for both the 1920×1080 and 1280×720 display formats is 74.25 MHz. Thus, the above-described 67.5 MHz and 81 MHz frequencies are attractive since they are both near 74.25 Hz, and they are both easily derived form the 27 MHz system clock $f_{SYS}$. It is desirable to provide clock frequencies that are relatively close to the standard clock frequencies, since the display device intended to be driven by the standard frequencies may have been optimized for use at those frequencies. For example, display devices comprise a number of tuned circuits for deflection and a shadow mask which is designed to support a particular scanning structure. The 94.5 MHz and 108 MHz are suitable for use in, e.g., liquid crystal displays and projection displays.

In order to use a non-standard display clock frequency (and the horizontal and vertical deflection signals derived from the display clock) to drive a display device, the standard format of the video signal to be displayed on the device must also be modified. This modification of the video signal is performed by the video processing circuitry described above. Specifically, the vertical resizer 140 and horizontal resizer 150 provide a format conversion function that is controlled by the controller 200. Similarly, the frame buffer provides a frame rate conversion function that is controlled by the controller 200.

In the exemplary embodiment of FIG. 1, the frame rate of the output video signal S8 is selected to be 30 Hz. However, this frame rate may be modified to, e.g., 60 Hz or 72 Hz if desired. For example, a method for synchronizing frame rate control and format control operations is described in more detail in co-pending U.S. patent application Ser. No. 09/001, 596 (Attorney Docket No. 12213), filed on the same day as the present application, and incorporated herein by reference in its entirety. Specifically, the described method and apparatus utilize electronic format and frame rate conversion in a multiple format video processing system adapted to avoid display motion artifacts causes by 3:2 conversion of 24 Hz video source video by tripling the frame rate of the source video and responsively adjusting the format of the resultant video signal. An example of a video processing system that automatically adjusts video processor operations, such as horizontal peaking, vertical peaking and colorimetry parameters, depending upon the format of a received video signal is described in more detail in co-pending U.S. patent application Ser. No. 09/001,620 (Attorney Docket No. 12669), filed on the same day as the present application, and incorporated herein by reference in its entirety.

To further reduce system cost, the DTV receiver 100 of FIG. 1 provides a fixed horizontal scanning frequency for use by the display device 175. Moreover, as previously raster clock $f_{RAST}$ and the fixed horizontal scanning frequency provided to the display device 175 are derived, in a straightforward manner, from the MPEG system clock $f_{SYS}$.

Figure 2:
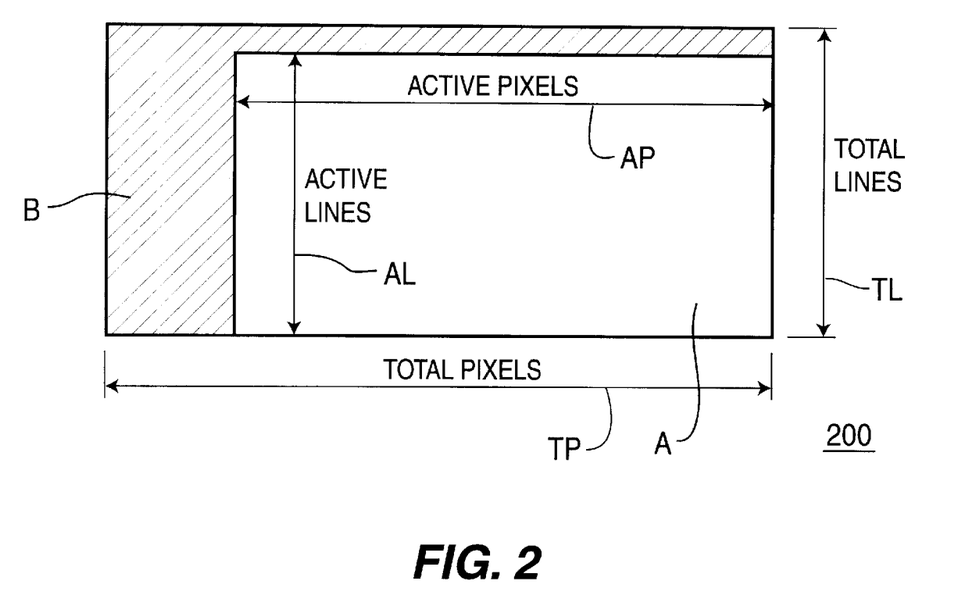
FIG. 2 depicts a representation of total and active picture areas of a 16×9 aspect ratio picture produced by a display device.

FIG. 2 depicts a representation 200 of total and active picture areas of a 16×9 aspect ratio picture produced by a display device. Specifically, FIG. 2 shows an active picture area A comprising a number of active lines AL and a number of active pixels AP bounded by a blanked picture area B. The total number of lines is denoted as TL, while the total number of pixels is denoted at TP. Prior art DTV receivers typically produce a picture having active line AL and active pixel AP parameters corresponding to the vertical line and pixel parameters of Table 1.

For purposes of the following discussion, it will be assumed that display device 175 comprises a high definition display device capable displaying 1080 active lines (out of 1125 total lines) at a resolution of 1920 active pixels per line (depending upon the raster clock $f_{RAST}$ and the horizontal deflection frequency H-DEF). Moreover, it will be assumed that the selected raster frequency $f_{RAST}$ is 67.5 MHz or 81 MHz.

As previously mentioned, an aspect of the present invention is the utilization of raster clock frequencies $f_{RAST}$ and horizontal deflection frequencies H-DEF that are related in a straightforward manner to the 27 MHz system clock $f_{SYS}$. A typical raster clock frequency that is used for both 1920×1080 and 1280×720 format video signals is 75 MHz. As such, several of the raster clock frequencies $f_{RAST}$ deemed by the inventor to be useful in practicing the invention are 67.5 MHz (5×27 MHz/2), 81 MHz (3×27 MHz), 94.5 MHz (7×27 MHz/2) and 108 MHz (7×27 MHz). As previously discussed with respect to timing circuit 110, these raster clock frequencies $f_{RAST}$ are relatively easy to produce using various known frequency scaling techniques. Moreover, the raster generator 190 may easily produce a horizontal deflection frequency of 33.75 kHz by dividing a 67.5 MHz raster clock $f_{RAST}$ by 2000, or by dividing an 81 MHz raster clock $f_{RAST}$ by 2400. Thus, the raster clock $f_{RAST}$, in conjunction with the selected horizontal deflection frequency H-DEF, determines the maximum number of pixels that may be displayed in a single horizontal line.

To satisfy the constraint of providing a fixed horizontal deflection frequency H-DEF and a raster clock frequency $f_{RAST}$ related to the system clock frequency $f_{SYS}$, the relationship between picture information and display timing must be roughly balanced. This rough balance, or relationship, may be mathematically described by the following equation:

$$(P_{ACTIVE}+P_{BLANK})(L_{ACTIVE}+L_{BLANK})=F_{RAST}/30$$

Referring to the above equation, the total number of active ($P_{ACTIVE}$) and blank ($P_{BLANK}$) pixels multiplied by total number of active ($L_{ACTIVE}$) and blank ($L_{BLANK}$) lines is equal to raster clock frequency ($f_{RAST}$) divided by the frame rate (e.g., 30 fps), where all pixel and line values are integers. Thus, to utilize a fixed horizontal deflection frequency H-DEF and a raster clock frequency $f_{RAST}$ related to the system clock frequency $f_{SYS}$, the controller 150 causes vertical resizer 140 to adjust the number of lines and/or horizontal resizer 150 to adjust the number of pixels in the video information represented by the decoded video signal S4.

In accordance with the invention, the total number of pixels per line for a given display is determined by the total number of lines native to the display, the selected raster clock frequency $f_{RAST}$, and the selected frame rate. For example, in the case of a display having 1125 lines (total), a raster clock of 67.5 MHz and a frame rate of 30 fps, the total number of pixels per line may be calculated as: $(P_{ACTIVE}+P_{BLANK})$=67.5 MHz/30/1125=2000 pixels. Similarly, if the raster clock is changed to 81 MHz, the total number of pixels per line may be calculated as: $(P_{ACTIVE}+P_{BLANK})$=81 MHz/30/1125=2400 pixels.

Further in accordance with the invention, the number of active lines to be displayed is determined by straightforward interpolation (if necessary), illustratively, a 2:1 upconversion of a 480 line formatted video signal to a 960 line formatted video signal. Moreover, the number of active pixels and active lines in a picture is determined, in the case of MPEG, typically using simple multiples of 16 to reflect the fact that each macroblock represents 16 pixels and 16 lines of picture. A simple multiple may be a power of two scaling, which can be implemented in hardware using simple shift registers, or in software using shift or rotate commands.

Furthermore, when switching between video streams or signals having different formats, it is undesirable to have a perceptible difference in total brightness. The perceived level of brightness is related to the number of active (i.e., displayed) pixels and, in the case of a cathode ray tube (CRT) type of display device, the amount of time that the electron beam is active (rather than blanked). Thus, to keep perceived level of brightness approximately constant when switching between video streams or signals having different formats, the controller utilizes vertical resizer 140 and horizontal resizer 150 to keep the total number of active pixels to remain approximately constant.

Table 2 shows a listing of several video format and raster clock combinations suitable for displaying, e.g., ATSC format video signals on a fixed horizontal scan frequency display device. Specifically, the contents of Table 2 are directed toward a display device having a fixed horizontal deflection frequency of 33.75 kHz, and a total of 1125 lines (including active and blanking lines). It must be understood that the information contained in Table 2 is based on a video frame rate of 30.00 Hz. The ATSC standard, and other standards, also allow 29.97 Hz frame rates (i.e., a factor of 1000/1001 frame rate reduction). Therefore, slight modifications to, e.g., the horizontal deflection frequencies and/or raster clock frequencies listed in Table 2 can easily be made to accommodate 29.97 Hz frame rates The first and second examples in Table 2 are directed toward keeping the total number of lines and pixels per line constant. The result is to have slightly different display window sizes. That is, input video signals having a 480 line format are scaled up to a 960 line format, while input video signals having a 1080 line format are displayed at the 1080 line format. In the first example includes the raster clock frequency $f_{RAST}$ is 67.5 MHz, while in the second example the raster clock frequency $f_{RAST}$ is 81 MHz.

The third example of Table 2 is directed toward reducing the differences in display window size by slightly cropping the 1080 line transmitted image in a display using a raster clock frequency $f_{RAST}$ of 67.5 MHz. This reduction in 1080 line window size is less noticeable than the change in display windows of the first example. That is, the visual effect of slightly cropping the higher definition formatted video signals is less noticeable than the change in display window size in the first two examples.

TABLE 2

| Active Lines | Total Lines | Active Pixels | Total Pixels/Line | Horizontal Defl. Freq. | Clock ($f_{RAST}$) |
|---|---|---|---|---|---|
| Example 1 | | | | | |
| 960 | 1125 | 1856 inset in 1920 | 2000 | 33.75 kHz | 67.5 MHz |
| 1080 | 1125 | 1920 | 2000 | 33.75 kHz | 67.5 MHz |
| Example 2 | | | | | |
| 960 | 1125 | 1856 inset in 1920 | 2400 | 33.75 kHz | 81 MHz |
| 1080 | 1125 | 1920 | 2400 | 33.75 kHz | 81 MHz |
| Example 3 | | | | | |
| 960 | 1125 | 1706 inset in 1856 | 2000 | 33.75 kHz | 67.5 MHz |
| 1024 (Cropped) | 1125 | 1856 (1920–64 cropped) | 2000 | 33.75 kHz | 67.5 MHz |

Referring now to the third example of Table 2, the native format of the display device 175 of the DTV receiver 100 of FIG. 1 is characterized by a 33.75 kHz horizontal deflection frequency, a 30 frames per second refresh rate, and a total of 1125 horizontal scan lines (including active and blank lines). In addition, the raster clock $f_{RAST}$ is 67.5 MHz. Thus, as discussed above, the total number of pixels per line is calculated to be 2000. The third example is directed toward reducing the differences in display window size of the first two examples by slightly cropping the 1080 line transmitted image.

The operation of the DTV receiver 100 will now be discussed within the context of an input video signal S2 having a format of 1920 pixels by 1080 lines (i.e., a high definition video signal). One skilled in the art will be able to adapt the teachings of the invention to video signals having other video formats, such as those depicted in Table 1.

If the video signal S2 comprises an interlaced video signal, the optional de-interlacer 130 may be utilized in the above-described manner to convert the interlaced video signal into a non-interlaced video signal S3. Similarly, if the video signal S2 comprises a video signal having a frame rate other than 30 Hz, the controller 200 will effect a frame rate conversion using the frame buffer 160 in the manner described above.

In the case of the input video signal S2 having a format of 1920 pixels by 1080 lines (i.e., a high definition video signal), the read address generator is used to crop 64 active pixels per line (e.g., remove the first and last 32 pixels of the line) to provide 1856 active pixels per line, and to crop 56 active lines per frame, to provide 1024 active lines per frame. These active line and active pixel parameters were selected to provide straightforward scaling parameters suitable for scaling the horizontal and vertical aspects of the video formats depicted in Table 1. Moreover, the active line and active pixel parameters were selected to provide relatively constant brightness levels when switching between formats.

In the important case of the input video signal S2 having a format of 640 pixels by 480 lines, the DTV receiver 100 will operate as follows. First, if the video signal S2 comprises an interlaced video signal, the de-interlacer 130 is utilized in the above-described manner to convert the interlaced video signal into a non-interlaced video signal S3. Second, the vertical resizer 140 doubles the vertical format of the video signal using, e.g., an interpolation technique to produce a 640 pixel by 960 line video signal S6. Thus, in the case of a 640 pixels by 480 lines, the number of active lines will be 960 while the number of blank lines will be 165.

A 640 pixels by 480 lines video signal conforming to MPEG standards is represented by a 40 by 30 macroblock grid. By doubling the number of lines, the representative macroblock grid becomes a 40 by 60 grid. To calculate the appropriate number of pixels per line, it is desirable to determine how many "horizontal" macroblocks may be added to the macroblock grid given the available number of pixels. In the first example, there are a total of 2000 pixels per line available, though only 1920 may be used as active pixels. Thus, the maximum number of "horizontal" macroblocks is 120 (i.e., 1920/16). However, to keep the scaling factors relatively simple, and the perceived level of brightness approximately constant when switching between video streams or signals having different formats, the number of active pixels selected is 1856.

The inventor selected 1856 active pixels per line in a nominal 1920 pixel per line format for several reasons. The amount of pixels in a 1920 pixel line may be reduced to 1856 pixels by removing exactly 32 pixels from each end of the line. It must also be noted that 32 pixels represent two macroblocks and that the number 32 is an easily manipulated base two number.

The information contained within Table 2 is directed toward a display device having a fixed horizontal deflection frequency of 33.75 kHz, and a total of 1125 lines (including active and blanking lines). Specifically, Table 2 is directed toward a display device having a native display format of 1920 pixels by 1080 lines. It must be noted that the teachings of the invention may be utilized to replicate information of the form presented in Table 2 to the native format of a different display device. Moreover, the raster frequencies of 67.5 MHz and 81 MHz depicted in the exemplary embodiment may be adapted to be similar to a raster frequency native to the different display device. Specifically, a raster clock $f_{RAST}$ may be selected that is easily derived from a system clock, yet similar to the raster frequency typically used in a the different display device.

The above-described video processing system provides several advantages over prior art systems. For example, by utilizing a 2:1 vertical upconversion in the important case of a 480 line format video signal, the circuit complexity is reduces when compared to the standard 9:4 upconversion circuitry. In addition, by synchronizing the raster clock to the system clock, the above-described system only requires a single clock circuit. Moreover, by selecting a raster frequency that is easily derived from the system clock the scaling circuitry necessary to produce the raster clock is greatly simplified. It must also be pointed out that the coordinated video format and frame rate conversion functions, when utilized in conjunction with the display timing function, provide a comprehensive approach to the design of cost-effective DTV television receivers.

One advantage of the above-described invention allows the use of a single precision clock source, such as a voltage controlled crystal oscillator, to derive all necessary clock signals. Moreover, the above-described invention does not require a different raster clock for each video format in, e.g., a DTV system. Such an advantage is especially useful in low cost systems.

It must be noted that the invention contemplates the use of other native display formats and other raster frequencies. The criteria for adapting the various DTV formats for display on a different display device is detailed above. First, a raster frequency $f_{RAST}$ is selected that is both easy to scale from the system clock (e.g., 27 MHz for MPEG systems), and near the conventional display clock frequency for the particular type of display device selected. Second, format conversion and frame rate conversion factors are determined in a manner that provides ease in video scaling calculations, and consistency in display window size and picture brightness which switching between various video formats.

In one embodiment of the invention, the video decoder 120 includes a 2:1 vertical resizer 122 that operates in the DCT domain. Specifically, video decoder 120 includes additional circuitry that is responsive to format information within the sequence header of the video signal S2. A method and apparatus for performing such a 2:1 upconversion in the DCT domain is disclosed by Martucci in U.S. Pat. No. 5,764,805, issued Jun. 1, 1998, and incorporated herein by reference in its entirety.

In one embodiment of the above-described invention, the controller 200 optionally produces a control signal DE-FOCUS that is related to the native line format of the display device and the number of scan lines provided to the display device. To reduce the "black space" between horizontal lines, the electron beams producing the lines may be slightly defocused, thereby increasing the thickness of each displayed line such that the "black space" between the lines is reduced. The amount of defocusing required to fill in the black space is related to the reduction, below a native format, of the number of lines to be displayed. Thus, the control signal DE-FOCUS provides an indicia of the reduction, below a native format, of the number of lines to be displayed.

The control signal DE-FOCUS is coupled to the display 175. In response to the control signal DE-FOCUS, the display 175 adjusts the focal point or otherwise causes the electron beams to converge upon a slightly larger area of the phosphor layer of the display than the nominal beam area convergence area. Thus, the control signal DE-FOCUS is used to widen, in a vertical manner, the electron beams within the display.

It is important to note that the use of the above-described optional defocusing method will preserve the brightness level of the display, since more of the display surface will be emitting light. As previously discussed, the display brightness should be approximately constant for each video format produced using a particular display device. Moreover, the amount of black space that may be absorbed using the defocusing method is limited by the structure of the shadow mask, the circuitry within the display device, and other factors known to those skilled in the art.

The above-described invention advantageously provides for a DTV receiver having a single master clock producing a raster or pixel clock from which a 27 MHz system clock and, optionally, an additional decoder clock having a different frequency, is easily synthesized. The DTV receiver includes a means of formatting a video signal that produces a formatted output video signal that is appropriate to a display raster derived from the raster clock $f_{RAST}$.

Although various embodiments which incorporate the teachings of the present invention have been shown and described in detail herein, those skilled in the art can readily devise many other varied embodiments that still incorporate these teachings.

What is claimed is:

1. Apparatus for processing an input video signal having one of a plurality of display formats to produce an output video signal suitable for use by a display device, said display device utilizing a fixed frequency horizontal deflection signal and a vertical deflection signal, said apparatus comprising:

a format converter, for selectively adapting at least a horizontal display format of said input video signal to a horizontal display format defined by aid fixed frequency horizontal deflection signal;

a frame rate converter, coupled to said format converter, for selectively adapting a frame rate of said input video signal to a frame rate of said display device;

a raster generator, for generating, in response to a raster clock signal, said fixed frequency horizontal deflection signal and said vertical deflection signal, said vertical deflection signal having a frequency defined by a vertical display format of said output video signal; and a clock circuit, responsive to a program clock reference (PCR) associated with said input video signal, for producing a system clock signal and said raster clock signal, said raster clock signal being generated by frequency scaling said system clock signal.

2. In a system for processing a video stream associated with at least one of a plurality of video display formats, a method for generating video and timing signals for use by a display device having a substantially fixed horizontal scanning frequency, said method comprising the steps of:

identifying a video display format associated with said video stream;

generating, in response to a program clock reference (PCR) associated with said video stream, a system clock signal and a raster clock signal, said raster clock signal being generated by frequency scaling said system clock signal;

generating, in response to the raster clock signal, a substantially fixed frequency horizontal synchronizing signal and a vertical synchronizing signal, said substantially fixed frequency horizontal synchronizing signal and said vertical synchronizing signal defining an active viewing area of a display device, said vertical deflection signal having a frequency defined by a vertical display format of said video stream; and adapting at least a horizontal display format of said video stream in response to a horizontal display format defined by said fixed frequency horizontal deflection signal.

3. The apparatus of claim 1, wherein said display format of said output video signal is adapted to a display format having a predetermined ratio of active lines to blank lines, said predetermined ratio of active lines to blank lines defining an average brightness level of the display device for said adapted display format.

4. The apparatus of claim 3, wherein said average brightness level of said display device is the same for each of a plurality of display formats.

5. The apparatus of claim 3, wherein said predetermined ratio of active lines to blank lines is determined with respect to the following equation:

$$(P_{ACTIVE}+P_{BLANK})(L_{ACTIVE}+L_{BLANK})=F_{RAST}/FR$$

where:

$P_{ACTIVE}$ comprises the total number of active pixels in each displayed line;

$P_{BLANK}$ comprises the total number of blank pixels in each displayed line;

$L_{ACTIVE}$ comprises the total number of active displayed lines;

$P_{BLANK}$ comprises the total number of blank displayed lines;

$F_{RAST}$ comprises the raster clock frequency; and

FR comprises the display frame rate.

6. The apparatus of claim 1, wherein:

said display device provides at least a 960 display lines and said horizontal display format of said input video signal comprises a 480 line format; and said format converter operates to double said horizontal display format of said input video signal to produce an output video signal having a 960 line format.

7. The apparatus of claim 5, wherein:

said display device provides at least a 960 display lines and said horizontal display format of said input video signal comprises a 480 line format;

said format converter operates to double said horizontal display format of said input video signal to produce an output video signal having a 960 line format.

8. The apparatus of claim 1, wherein said clock circuit comprises:

phase locked loop circuit, responsive to a program clock reference (PCR) within a transport stream bearing said input video signal, for producing said system clock; and a frequency scalar, responsive to a raster clock control signal, for scaling said system clock to produce said raster clock.

9. The apparatus of claim 8, wherein said system clock frequency comprises a 27 MHz clock frequency, and said raster clock frequency comprises one of a 67.5 MHz clock frequency, a 81 MHz clock frequency, a 94.5 MHz clock frequency and a 108 MHz clock frequency.

10. The apparatus of claim 1, wherein said raster generator selectively causes said display device to operate in a de-focused mode of operation, said display device producing a wider electron beam in said de-focused mode of operation.

11. The apparatus of claim 10, wherein said de-focused mode of operation is used to provide an average brightness level of said display for each of a plurality of display formats.

12. The method of claim 2, wherein said display format of said video stream is adapted to a display format having a predetermined ratio of active lines to blank lines, said predetermined ratio of active lines to blank lines defining an average brightness level of the display device for said adapted display format.

13. The method of claim 12, wherein said average brightness level of said display device is substantially the same for each of said plurality of display formats.

14. The method of claim 12, wherein said predetermined ratio of active lines to blank lines is determined with respect to the following equation:

$$(P_{ACTIVE}+P_{BLANK})(L_{ACTIVE}+L_{BLANK})=F_{RAST}/FR$$

where:

$P_{ACTIVE}$ comprises the total number of active pixels in each displayed line;

$P_{BLANK}$ comprises the total number of blank pixels in each displayed line;

$L_{ACTIVE}$ comprises the total number of active displayed lines;

$P_{BLANK}$ comprises the total number of blank displayed lines;

$F_{RAST}$ comprises the raster clock frequency; and

FR comprises the display frame rate.

15. The method of claim 12, wherein said display device provides at least a 960 display lines, said horizontal display format of said video stream comprises a 480 line format, and said step of adapting comprising the step of:

doubling said horizontal display format of said video stream to produce a video stream having a 960 line format.

16. The method of claim 12, wherein said display device provides at least a 960 display lines and said horizontal display format of said video stream comprises a 480 line format, said step of adapting comprising the step of:

doubling said horizontal display format of said video stream to produce a video stream having a 960 line format.

17. The method of claim 12, wherein said reference clock signal associated with said video stream comprises:

a program clock reference (PCR) within a transport stream bearing said video stream.

18. The method of claim 17, wherein said system clock frequency comprises a 27 MHz clock frequency, and said raster clock frequency comprises one of a 67.5 MHz clock frequency, a 81 MHz clock frequency, a 94.5 MHz clock frequency and a 108 MHz clock frequency.

19. The method of claim 12, further comprising the step of:

selectively causing said display device to operate in a de-focused mode of operation, said display device producing a wider electron beam in said de-focused mode of operation.

20. The method of claim 19, wherein said de-focused mode of operation is used to provide an average brightness level of said display for each of a plurality of display formats.

* * * * *

UNITED STATES PATENT AND TRADEMARK OFFICE
CERTIFICATE OF CORRECTION

PATENT NO. : 6,118,486  
APPLICATION NO. : 09/001952  
DATED : September 12, 2000  
INVENTOR(S) : Reitmeier Page 1 of 1

It is certified that error appears in the above-identified patent and that said Letters Patent is hereby corrected as shown below:

Claim 2, Column 14, lines 48 to 49, change "vertical deflection signal" to --vertical synchronizing signal--.

Claim 2, Column 14, lines 53 to 54, change "horizontal deflection signal" to --horizontal synchronizing signal--.

Signed and Sealed this

Second Day of September, 2008

JON W. DUDAS  
*Director of the United States Patent and Trademark Office*